US008092905B2

(12) United States Patent
Kleiman-Shwarsctein et al.

(10) Patent No.: US 8,092,905 B2
(45) **Date of Patent: *Jan. 10, 2012**

(54) COMPOSITIONS CONTAINING MULTIFUNCTIONAL NANOPARTICLES

(75) Inventors: Alan Kleiman-Shwarsctein, Goleta, CA (US); Kostantinos Kourtakis, Media, PA (US); Bao-Ling Yu, Chads Ford, PA (US)

(73) Assignee: E.I du Pont de Nemours and Company, Wilmington, DE (US)

( * ) Notice: Subject to any disclaimer, the term of this patent is extended or adjusted under 35 U.S.C. 154(b) by 651 days.

This patent is subject to a terminal disclaimer.

(21) Appl. No.: 12/249,078

(22) Filed: Oct. 10, 2008

(65) Prior Publication Data

US 2010/0092763 A1 Apr. 15, 2010

(51) Int. Cl.
*B32B 5/16* (2006.01)
*G11B 11/105* (2006.01)

(52) U.S. Cl. ......... 428/331; 427/387; 523/218; 524/264

(58) Field of Classification Search .................. 427/387; 428/331; 523/218; 524/264

See application file for complete search history.

(56) References Cited

U.S. PATENT DOCUMENTS

| | | | | |
|---|---|---|---|---|
| 2,801,185 | A | 7/1957 | Iler | |
| 2,968,649 | A | 1/1961 | Pailthorp et al. | |
| 3,051,677 | A | 8/1962 | Rexford | |
| 3,682,872 | A | 8/1972 | Brizzolara et al. | |
| 4,035,565 | A | 7/1977 | Apotheker et al. | |
| 4,281,092 | A | 7/1981 | Breazeale | |
| 4,522,958 | A | 6/1985 | Das et al. | |
| 4,694,045 | A | 9/1987 | Moore | |
| 4,791,881 | A | 12/1988 | Iwasaki | |
| 5,648,407 | A | 7/1997 | Goetz et al. | |
| 5,789,509 | A | 8/1998 | Schmiegel | |
| 5,824,755 | A | 10/1998 | Hayashi et al. | |
| 2005/0018733 | A1 | 1/2005 | Wada et al. | |
| 2008/0032052 | A1 * | 2/2008 | Kourtakis et al. | 427/387 |
| 2008/0032053 | A1 * | 2/2008 | Kourtakis et al. | 427/387 |

FOREIGN PATENT DOCUMENTS

| | | |
|---|---|---|
| JP | 2001233611 | 8/2001 |
| JP | 2002079616 | 3/2002 |

* cited by examiner

*Primary Examiner* — Terressa Boykin

(57) ABSTRACT

Compositions containing multifunctional nanoparticles are provided. The compositions are the reaction product of fluoroelastomer having at least one cure site, and the reaction product of nanosilica with more than one type of silane coupling agent. The compositions can be used to form abrasion resistant anti-reflective coatings.

25 Claims, No Drawings

COMPOSITIONS CONTAINING MULTIFUNCTIONAL NANOPARTICLES

FIELD OF INVENTION

The present invention relates to compositions that are reaction products of fluoroelastomer having at least one cure site, with the reaction product of nanosilica with a silicon compound containing a vinyl group a silane having at least one acryloyloxy or methacryloyloxy functional group.

BACKGROUND

Optical materials are characterized by their refractive index. Whenever light travels from one material to another of different index, some of the light is reflected. Unwanted reflections can be substantially reduced by providing an anti-reflective coating. Anti-reflective (AR) coatings (also called antireflection coatings) are a type of optical coating applied to the surface of optical devices to reduce reflection. Many coatings consist of transparent thin film structures with one or more alternating layers of contrasting refractive index. Layer thicknesses are chosen to produce destructive interference in the beams reflected from the interfaces, and constructive interference in the corresponding transmitted beams. For a single low refractive index thin film coating on an optical article with refractive index n, in order to reach the maximum effectiveness, the anti-reflective coating should have an optical thickness (the physical thickness multiplied by its own refractive index) about a quarter of the wavelength of the incoming light and have a refractive index of the square root of n if the other interface is air. Most optical articles have a refractive index ranging from 1.4 to 1.6.

It is known that low refractive index anti-reflective coatings can be prepared from fluorinated polymers. The refractive index of a fluorinated polymer correlates with the amount of fluorine in the polymer. Increasing the fluorine content in the polymer decreases the refractive index of the polymer. Considerable industry attention has been directed towards anti-reflective coatings containing fluorinated polymers.

Fluoropolymers with low crystallinity that are soluble in organic solvents typically form coatings having undesirable mechanical properties, such as poor abrasion resistance and poor interfacial adhesion between the fluoropolymer coating and the underlying optical display substrates such as plastics and glass. Various modifications have been explored in order to improve their abrasion resistance and adhesion to substrates.

There is a continuing need in the industry, in the field of optical displays, for anti-reflective coatings having low visible light reflectivity as well as good adhesion to optical display substrates and good scratch resistance.

SUMMARY OF THE INVENTION

One aspect of the present invention is an uncured composition comprising:

(i) a fluoroelastomer having at least one cure site;

(ii) a multiolefinic crosslinker;

(iii) a free radical polymerization initiator; and (iv) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, said hydrolysis product or hydrolysis and condensation product formed by reacting the first silane with a nanosilicon oxide colloid containing greater than 0% water; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15 moles of water per mole of hydrolyzable functional group bonded to the silicon of the second silane.

Another aspect of the present invention is an uncured composition comprising:

(i) a fluoroelastomer having at least one cure site;

(ii) a multiolefinic crosslinker;

(iii) a free radical polymerization initiator; and (iv) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, wherein the hydrolysis product or hydrolysis and condensation product is formed by contacting the first silane, in the presence of a catalyst, with from about 1 to about 15 moles of water per mole of hydrolyzable functional group bonded to the silicon of the first silane; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15 moles of water per mole of hydrolyzable functional group bonded to the silicon of the second silane.

A further aspect of the invention is a method for forming a coating on a substrate, comprising:

(i) forming a liquid mixture comprising a solvent having dissolved therein;

(i-a) a fluoroelastomer having at least one cure site;

(i-b) a multiolefinic crosslinker;

(i-c) a free radical polymerization initiator; and (i-d) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, said hydrolysis product or hydrolysis and condensation product formed by reacting the first silane with a nanosilicon oxide colloid containing greater than 0% water; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15 moles of water per mole of hydrolyzable functional group bonded to the silicon of the second silane;

(ii) applying said liquid mixture onto a substrate to form a liquid mixture coating on said substrate;

(iii) removing solvent from said liquid mixture coating to form an uncured coating on said substrate; and (iv) curing said uncured coating.

Another aspect of the invention is a method for forming a coating on a substrate, comprising:

(i) forming a liquid mixture comprising a solvent having dissolved therein;

(i-a) a fluoroelastomer having at least one cure site;

(i-b) a multiolefinic crosslinker;

(i-c) a free radical polymerization initiator; and (i-d) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, wherein the hydrolysis product or hydrolysis and condensation product is formed by contacting the first silane, in the presence of a catalyst, with from about 1 to about 15, preferably about 3 to about 9 moles of water, per mole of hydrolyzable functional group bonded to the silicon of the first silane; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the silane; wherein the hydrolysis product or hydrolysis and condensation product is formed by contacting the second silane, in the presence of a catalyst, with from about 1 to about 15, preferably about 3 to about 9 moles of water per mole of hydrolyzable functional group bonded to the silicon of the second silane;

(ii) applying said liquid mixture onto a substrate to form a liquid mixture coating on said substrate;

(iii) removing solvent from said liquid mixture coating to form an uncured coating on said substrate; and (iv) curing said uncured coating.

These and other aspects of the invention will be apparent to one skilled in the art in view of the following disclosure and the appended claims.

DETAILED DESCRIPTION

The compositions disclosed herein can be used as coatings and can provide low refractive indices, improved scratch resistance and/or low reflectivity.

Herein the term "uncured composition" refers to a composition as recited above which can be deposited onto a substrate to form a coating, and subsequently cured. Uncured composition can further comprise other components such as polar aprotic solvent to facilitate handling and coating.

In some embodiments, the uncured compositions can be used to form coatings on substrates, which can then be cured.

The compositions disclosed herein contain a "first silane" and a "second silane". However, the distinctions "first" and "second" are not intended to imply any sequential order, in the compositions or in methods using the compositions.

In some embodiments, the uncured compositions disclosed herein are used to form a coating, which is then cured. In preferred embodiments the coating, after curing, has a refractive index of from about 1.20 to about 1.49. In another embodiment the composition has a refractive index of from about 1.30 to about 1.44.

In some embodiments, the present invention provides finished articles containing the compositions disclosed herein. The compositions can be deposited, uncured, onto a substrate, and cured to form a coating. In some embodiments, an optical film is provided, the film including a substrate and a coating of a composition disclosed herein.

One component of the uncured compositions is at least one fluoroelastomer having at least one cure site. Preferred cure sites include bromine, iodine and ethenyl. The fluoroelastomer contains at least about 65 weight % fluorine, preferably at least about 70 weight % fluorine, and is a substantially amorphous copolymer characterized by having carbon-carbon bonds in the copolymer backbone. The fluoroelastomer comprises repeating units arising from two or more types of monomers and has cure sites allowing for crosslinking to form a three dimensional network. A first monomer type gives rise to straight fluoroelastomer chain segments with a tendency to crystallize. A second monomer type having a bulky group is incorporated into the fluoroelastomer chain at intervals to break up such crystallization tendency and produce a substantially amorphous elastomer. Monomers of utility for straight chain segments are those without bulky substituents and include: vinylidene fluoride (VDF), $CH_2{=}CF_2$; tetrafluoroethylene (TFE), $CF_2{=}CF_2$; chlorotrifluoroethylene (CTFE), $CF_2{=}CFCl$; and ethylene (E), $CH_2{=}CH_2$. Monomers with bulky groups useful for disrupting crystallinity include hexafluoropropylene (HFP), $CF_2{=}CFCF_3$; 1-hydropentafluoropropylene, $CHF{=}CFCF_3$; 2-hydropentafluoropropylene, $CF_2{=}CHCF_3$; perfluoro(alkyl vinyl ether)s (e.g., perfluoro(methyl vinyl) ether (PMVE), $CF_2{=}CFOCF_3$); and propylene (P), $CH_2{=}CHCH_3$. Fluoroelastomers are generally described by A. Moore in *Fluoroelastomers Handbook: The Definitive User's Guide and Databook*, William Andrew Publishing, ISBN 0-8155-1517-0 (2006).

The cure sites can be located on, or on groups attached to, the fluoroelastomer backbone and arise from including cure site monomers in the polymerization to make the fluoroelastomer. Halogenated cure sites can also be located at fluoroelastomer chain ends and arise from the use of halogenated chain transfer agents in the polymerization to make the fluoroelastomer. The fluoroelastomer containing cure sites is subjected to reactive conditions, also referred to as curing (e.g., thermal or photochemical curing), that results in the formation of covalent bonds (i.e., crosslinks) between the fluoroelastomer and other components in the uncured composition. Cure site monomers leading to the formation of cure sites located on, or on groups attached to, the fluoroelastomer backbone generally include brominated alkenes and brominated unsaturated ethers (resulting in a bromine cure site), iodinated alkenes and iodinated unsaturated ethers (resulting in an iodine cure site), and dienes containing at least one ethenyl functional group that it is not in conjugation with other carbon-carbon unsaturation or carbon-oxygen unsaturation (resulting in an ethenyl cure site). Additionally, or alternatively, iodine atoms, bromine atoms or mixtures thereof can be present at the fluoroelastomer backbone chain ends as a result of the use of chain transfer agent during polymerization to make the fluoroelastomer. Fluoroelastomers of utility preferably contain from about 0.25 weight % to about 1 weight % of cure site, preferably about 0.35 weight % of cure site, based on the weight of monomers comprising the fluoroelastomer.

Fluoroelastomer containing bromine cure sites can be obtained by copolymerizing brominated cure site monomers into the fluoroelastomer during polymerization to form the fluoroelastomer. Brominated cure site monomers have carbon-carbon unsaturation with bromine attached to the double bond or elsewhere in the molecule and can contain other elements including H, F and O. Example brominated cure site monomers include bromotrifluoroethylene, vinyl bromide, 1-bromo-2,2-difluoroethylene, perfluoroallyl bromide, 4-bromo-1,1,2-trifluorobutene, 4-bromo-3,3,4,4-tetrafluoro-1-butene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluoro-1-butene, and 3,3-difluoroallyl bromide. Further examples include brominated unsaturated ethers such as 2-bromo-perfluoroethyl perfluorovinyl ether and fluorinated compounds of the class $BrCF_2$ (perfluoroalkylene)$OCF{=}CF_2$, such as $CF_2BrCF_2OCF{=}CF_2$, and fluorovinyl ethers of the class $ROCF{=}CFBr$ and $ROCBr{=}CF_2$, where R is a lower alkyl group or fluoroalkyl group, such as $CH_3OCF{=}CFBr$ and $CF_3CH_2OCF{=}CFBr$.

Fluoroelastomer containing iodine cure sites can be obtained by copolymerizing iodinated cure site monomers into the fluoroelastomer during polymerization to form the fluoroelastomer. Iodinated cure site monomers have carbon-carbon unsaturation with iodine attached to the double bond or elsewhere in the molecule and can contain other elements including H, Br, F and O. Example iodinated cure site monomers include iodoethylene, iodotrifluoroethylene, 4-iodo-3,3,4,4-tetrafluoro-1-butene, 3-chloro-4-iodo-3,4,4-trifluorobutene, 2-iodo-1,1,2,2-tetrafluoro-1-(vinyloxy)ethane, 2-iodo-1-(perfluorovinyloxy)-1,1,2,2-tetrafluoroethylene, 1,1,2,3,3,3-hexafluoro-2-iodo-1-(perfluorovinyloxy)propane, 2-iodoethyl vinyl ether, and 3,3,4,5,5,5-hexafluoro-4-iodopentene. Further examples include olefins of the formula $CHR{=}CHZCH_2CHRI$, wherein each R is independently H or $CH_3$, and Z is a $C_1$-$C_{18}$ (per)fluoroalkylene radical, linear or branched, optionally containing one or more ether oxygen atoms, or a (per)fluoropolyoxyalkylene radical. Further examples of iodinated cure site monomers of utility are unsaturated ethers of the formula $I(CH_2CF_2CF_2)_nOCF{=}CF_2$ and $ICH_2CF_2O[CF(CF_3)CF_2O]_nCF{=}CF_2$, wherein n=1-3.

Fluoroelastomer containing ethenyl cure sites is obtained by copolymerizing ethenyl-containing cure site monomers into the fluoroelastomer during polymerization to form the fluoroelastomer. Ethenyl cure site monomers have carbon-carbon unsaturation with ethenyl functionality that it is not in conjugation with other carbon-carbon or carbon-oxygen unsaturation. Thus, ethenyl cure sites can arise from non-conjugated dienes having at least two points of carbon-carbon unsaturation and optionally containing other elements including H, Br, F and O. One point of carbon-carbon unsaturation is incorporated (i.e., polymerizes) into the fluoroelastomer backbone, the other is pendant to the fluoroelastomer backbone and is available for reactive curing (i.e., crosslinking). Example ethenyl cure site monomers include non-conjugated dienes and trienes such as 1,4-pentadiene, 1,5-hexadiene, 1,7-octadiene, 8-methyl-4-ethylidene-1,7-octadiene and the like.

Preferred cure site monomers are bromotrifluoroethylene, 4-bromo-3,3,4,4-tetrafluoro-1-butene and 4-iodo-3,3,4,4-tetrafluoro-1-butene-1.

Suitable chain transfer agents include halogenated compounds that result in bound halogen at one or both ends of the polymer chains. Example chain transfer agents of utility include methylene iodide, 1,4-diiodoperfluoro-n-butane, 1,6-diiodo-3,3,4,4-tetrafluorohexane, 1,3-diiodoperfluoropropane, 1,6-diiodoperfluoro-n-hexane, 1,3-diiodo-2-chloroperfluoropropane, 1,2-di(iododifluoromethyl) perfluorocyclobutane, monoiodoperfluoroethane, monoiodoperfluorobutane, 2-iodo-1-hydroperfluoroethane, 1-bromo-2-iodoperfluoroethane, 1-bromo-3-iodoperfluoropropane, and 1-iodo-2-bromo-1,1-difluoroethane. Preferred are chain transfer agents containing both iodine and bromine.

Fluoroelastomers containing cure sites can be prepared by polymerization of the appropriate monomer mixtures with the aid of a free radical initiator either in bulk, in solution in an inert solvent, in aqueous emulsion or in aqueous suspension. The polymerizations may be carried out in continuous, batch, or in semi-batch processes. General polymerization processes of utility are discussed in the aforementioned Moore Fluoroelastomers Handbook. General fluoroelastomer preparative processes are disclosed in U.S. Pat. Nos. 4,281,092; 3,682,872; 4,035,565; 5,824,755; 5,789,509; 3,051,677; and 2,968,649.

Examples of fluoroelastomers containing cure sites include: copolymers of cure site monomer, vinylidene fluoride, hexafluoropropylene and, optionally, tetrafluoroethylene; copolymers of cure site monomer, vinylidene fluoride, hexafluoropropylene, tetrafluoroethylene and chlorotrifluoroethylene; copolymers of cure site monomer, vinylidene fluoride, perfluoro(alkyl vinyl ether) and, optionally, tetrafluoroethylene; copolymers of cure site monomer, tetrafluoroethylene, propylene and, optionally, vinylidene fluoride; and copolymers of cure site monomer, tetrafluoroethylene and perfluoro(alkyl vinyl ether), preferably perfluoro(methyl vinyl ether). Fluoroelastomers containing polymerized units arising from vinylidene fluoride are preferred. In one embodiment, fluoroelastomer comprises copolymerized units of cure site monomer, vinylidene fluoride, hexafluoropropylene, and tetrafluoroethylene.

Fluoroelastomers comprising ethylene, tetrafluoroethylene, perfluoro(alkyl vinyl ether) and a bromine-containing cure site monomer, such as those disclosed by Moore, in U.S. Pat. No. 4,694,045, are of utility in present compositions. Also of utility are the Viton® GF-series fluoroelastomers, for example Viton® GF-200S, available from DuPont Performance Elastomers, Del., USA.

Another component of the compositions is at least one multiolefinic crosslinker. By “multiolefinic” it is meant that it contains at least two carbon-carbon double bonds that are not in conjugation with one another.

Multiolefinic crosslinker is present in the uncured compositions in an amount of from about 1 to about 25 parts by weight per 100 parts by weight fluoroelastomer containing cure sites (phr), preferably from about 5 to about 15 phr. Multiolefinic crosslinkers of utility include those containing acrylic (e.g., acryloyloxy, methacryloyloxy) and allylic functional groups.

Acrylic multiolefinic crosslinkers include those represented by the formula $R(OC({=}O)CR'{=}CH_2)_n$, wherein: R is linear or branched alkylene, linear or branched oxyalkylene, aromatic, aromatic ether, or heterocyclic; R' is H or $CH_3$; and n is an integer from 2 to 8. Representative polyols from which acrylic multiolefinic crosslinkers can be prepared include: ethylene glycol, propylene glycol, triethylene glycol, trimethylolpropane, tris-(2-hydroxyethyl)isocyanurate, pentaerythritol, ditrimethylolpropane and dipentaerythritol. Representative acrylic multiolefinic crosslinkers include 1,3-butylene glycol di(meth)acrylate, 1,6-hexanediol di(meth) acrylate, neopentyl glycol di(meth)acrylate, polyethylene glycol di(meth)acrylate, polypropylene glycol di(meth)acrylate, ethoxylated bisphenol-A di(meth)acrylate, propoxylated bisphenol-A di(meth)acrylate, alkoxylated cyclohexane dimethanol di(meth)acrylate, cyclohexane dimethanol di(meth)acrylate, trimethylolpropane tri(meth)acrylate, ethoxylated trimethylolpropane tri(meth)acrylate, propoxylated trimethylolpropane tri(meth)acrylate, bistrimethylolpropane tetra(meth)acrylate, tris(2-hydroxyethyl)isocyanurate tri(meth)acrylate, pentaerythritol tri(meth)acrylate, pentaerythritol tetra(meth)acrylate, ethoxylated glycerol tri (meth)acrylate, propoxylated glycerol tri(meth)acrylate, pentaerythritol tetra(meth)acrylate, ethoxylated pentaerythritol tetra(meth)acrylate, propoxylated pentaerythritol tetra(meth) acrylate, dipentaerythritol penta(meth)acrylate, dipentaerythritol hexa(meth)acrylate, and combinations thereof. Herein, the designation "(meth)acrylate" is meant to encompass both acrylate and methacrylate.

Allylic multiolefinic crosslinkers include those represented by the formula $R(CH_2CR'{=}CH_2)_n$, wherein R is linear or branched alkylene, linear or branched oxyalkylene, aromatic, aromatic ether, aromatic ester or heterocyclic; R' is H or $CH_3$; and n is an integer from 2 to 6. Representative allylic multiolefinic crosslinkers include 1,3,5-triallyl isocyanurate, 1,3,5-triallyl cyanurate, and triallyl benzene-1,3,5-tricarboxylate.

Another component of the uncured compositions is at least one free radical polymerization initiator.

In embodiments where UV radiation initiation is used to cure the uncured composition, the uncured composition includes generally between 1 and 10 phr, preferably between 5 and 10 phr, of photoinitiator. Photoinitiators can be used singly or in combinations of two or more. Free-radical photoinitiators of utility include those generally useful to UV cure acrylate polymers. Example photoinitiators of utility include benzophenone and its derivatives; benzoin, alpha-methylbenzoin, alpha-phenylbenzoin, alpha-allylbenzoin, alpha-benzylbenzoin; benzoin ethers such as benzyl dimethyl ketal (commercially available as Irgacure® 651 (Irgacure® products available from Ciba Specialty Chemicals Corporation, Tarrytown, N.Y., USA)), benzoin methyl ether, benzoin ethyl ether, benzoin n-butyl ether; acetophenone and its derivatives such as 2-hydroxy-2-methyl-1-phenyl-1-propanone (commercially available as Darocur® 1173 (Darocur® products available from Ciba Specialty Chemicals Corporation, Tarrytown, N.Y., USA)) and 1-hydroxycyclohexyl phenyl ketone (commercially available as Irgacure® 184); 2-methyl-1-[4-methylthio)phenyl]-2-(4-morpholinyl)-1-propanone (commercially available as Irgacure® 907); alkyl benzoyl formates such as methylbenzoylformate (commercially available as Darocur® MBF); 2-benzyl-2-(dimethylamino)-1-[4-(4-morpholinyl)phenyl]-1-butanone (commercially available as Irgacure® 369); aromatic ketones such as benzophenone and its derivatives and anthraquinone and its derivatives; onium salts such as diazonium salts, iodonium salts, sulfonium salts; titanium complexes such as, for example, that which is commercially available as "CGI 784 DC", also from Ciba Specialty Chemicals Corporation; halomethylnitrobenzenes; and mono- and bis-acylphosphines such as those available from Ciba Specialty Chemicals Corporation under the trade designations Irgacure® 1700, Irgacure® 1800, Irgacure® 1850, Irgacure® 819, Irgacure® 2005, Irgacure® 2010, Irgacure® 2020 and Darocur® 4265. Further, sensitizers such as 2- and 4-isopropyl thioxanthone, commercially available from Ciba Specialty Chemicals Corporation as Darocur® ITX, may be used in conjunction with the aforementioned photoinitiators.

Photoinitiators are typically activated by incident light having a wavelength between about 254 nm and about 450 nm. In one embodiment, the uncured composition is cured by light from a high pressure mercury lamp having strong emissions around wavelengths 260 nm, 320 nm, 370 nm and 430 nm. In this embodiment, of utility is a combination of at least one photoinitiator with relatively strong absorption at shorter wavelengths (i.e., 245-350 nm), and at least one photoinitiator with relatively strong absorption at longer wavelengths (i.e., 350-450 nm) to cure the present uncured compositions. Such a mixture of initiators results in the most efficient usage of energy emanating from the UV light source. Examples of photoinitiators with relatively strong absorption at shorter wavelengths include benzil dimethyl ketal (Irgacure® 651) and methylbenzoyl formate (Darocur® MBF). Examples of photoinitiators with relatively strong absorption at longer wavelengths include 2- and 4-isopropyl thioxanthone (Darocur® ITX). An example such mixture of photoinitiators is 10 parts by weight of a 2:1 weight ratio mixture of Irgacure® 651 and Darocur® MBF, to 1 part by weight of Darocur® ITX.

Thermal initiators may also be used together with photoinitiator when UV curing. Useful thermal initiators include, for example, azo, peroxide, persulfate and redox initiators.

UV curing of present uncured compositions can be carried out in the substantial absence of oxygen, which can negatively influence the performance of certain UV photoinitiators. To exclude oxygen, UV curing can be carried out under an atmosphere of inert gas such as nitrogen.

UV curing of present uncured compositions can be carried out at ambient temperature. An elevated temperature of from about 60° C. to about 85° C. is of utility, and preferred is a temperature of about 75° C. Carrying out UV curing at an elevated temperature results in a more complete cure.

When thermal decomposition of organic peroxide is used to generate free radicals for curing the uncured composition, the uncured composition generally includes between 1 and 10 phr, preferably between 5 and 10 phr of organic peroxide. Useful free-radical thermal initiators include, for example, azo, peroxide, persulfate, and redox initiators, and combinations thereof. Organic peroxides are preferred, and example organic peroxides include: 1,1-bis(t-butylperoxy)-3,5,5-trimethylcyclohexane; 1,1-bis(t-butylperoxy)cyclohexane; 2,2-bis(t-butylperoxy)octane; n-butyl-4, 4-bis(t-butylperoxy) valerate; 2,2-bis(t-butylperoxy)butane; 2,5-dimethylhexane-2,5-dihydroxyperoxide; di-t-butyl peroxide; t-butylcumyl peroxide; dicumyl peroxide; alpha,alpha'-bis(t-butylperoxy-m-isopropyl)benzene; 2,5-dimethyl-2,5-di(t-butylperoxy) hexane; 2,5-dimethyl-2,5-di(t-butylperoxy)hexene-3; benzoyl peroxide; t-butylperoxybenzene; 2,5-dimethyl-2,5-di (benzoylperoxy)-hexane; t-butylperoxymaleic acid; and t-butylperoxyisopropylcarbonate. Benzoyl peroxide is preferred organic peroxide. Organic peroxides may be used singly or in combinations of two or more.

Another component of the uncured compositions is a nanosilica composite. One component used to form the nanosilica composite is a silicon compound having at least one vinyl group. The vinyl group can be present in a silicon compound such as a disilazane of the formula $(R^1{}_3Si)_2NH$, where at least one $R^1$ is a functional group represented by the vinyl group, CH2=CH—. The remaining $R^1$ groups can be vinyl, alkyl, or aryl groups.

Suitable nanosilica can be obtained commercially, or synthesized in a variety of ways. A predispersed nanosilicon oxide colloid can be used. Solid nanosilica particles of utility can be any shape, including spherical and oblong, and are relatively uniform in size and remain substantially non-aggregated. In one embodiment, the solid nanosilica particles have a median particle diameter $d_{50}$ of from about 1 nm to about 90 nm. In one embodiment, the solid nanosilica particles have a $d_{50}$ of from about 5 nm to about 60 nm. In one embodiment, the solid nanosilica particles have a $d_{50}$ of from about 15 nm to about 30 nm.

Porous nanosilica particles of utility have a d50 of from about 5 nm to about 90 nm, preferably from about 5 nm to about 70 nm. Porous nanosilica particles can have pores of any shape. One example is where the pore comprises a void of lower density (e.g., a void containing air) formed within a shell of silicon oxide, i.e., a hollow nanosilica particle. The thickness of the nanoparticle shell affects the strength of the nanoparticles. Assuming that the radius of the void inside a particle is x and the radius of the outer shell of the particle is y, the porosity (P) as represented by the formula P=(4×3/3)/(4y3/3)100 is generally from about 10% to about 60%, and preferably from about 30% to about 60%. Methods for producing such hollow nanosilica particles are known, and described, for example, in JP-A-2001/233611 and JP-A-2002/79616.

In one embodiment where solid nanosilica particles are used in the absence of porous nanosilica particles, the solid nanosilica particles have a $d_{50}$ of about 30 nm and less. In one embodiment where solid nanosilica particles are used together with porous nanosilica particles, the solid nanosilica particles have a $d_{50}$ of from about 1 nm to about 50 nm. The median particle diameter ($d_{50}$) is the diameter for which half the volume or mass of the particle population is composed of particles having a diameter smaller than this value, and half the volume or mass of the particle population is composed of particles having a diameter larger than this value.

Aggregation of the solid nanosilica particles undesirably results in precipitation, gelation, and a dramatic increase in sol viscosity that may make uniform coatings of the uncured composition difficult to achieve. Solid nanosilica particles may aggregate to form aggregate particles in the colloid, wherein each of the aggregate particles comprises a plurality of smaller sized solid nanoparticles. The average aggregate solid nanosilica particle diameter in the colloid is desirably less than about 90 nm before coating.

Solid nanosilica particles of utility for forming the nanosilica composite are produced from sols of silicon oxides (e.g., colloidal dispersions of solid silicon nanoparticles in liquid media), especially sols of amorphous, semi-crystalline, and/or crystalline silica. Such sols can be prepared by a variety of techniques and in a variety of forms, which include hydrosols (where water serves as the liquid medium), organosols (where organic liquids serve as the liquid medium), and mixed sols (where the liquid medium comprises both water and an organic liquid). See, e.g., the descriptions of the techniques and forms given in U.S. Pat. Nos. 2,801,185; 4,522,958; and 5,648,407. Where the solid nanosilica sol is produced in aprotic solvent (e.g., water, alcohol) in which the other uncured composition components (e.g., fluoroelastomer) are not soluble, it is preferable to replace at least about 90 volume percent, more preferably at least about 97 volume percent, of such protic solvent with a solvent in which the other uncured composition components are soluble before the sol is used in formation of the nanosilica composite. Methods for such solvent replacement are known, for example, distillation under reduced pressure. Solid nanosilica particles can be commercially obtained as colloidal dispersions or sols dispersed in polar aprotic solvents in which the other uncured composition components are soluble, for example Nissan MEK-ST, a solid silica colloid in methyl ethyl ketone containing about 0.5 weight percent water, median nanosilica particle diameter $d_{50}$ of about 16 nm, 30-31 wt % silica, available from Nissan Chemicals America Corporation, Houston, Tex., USA.

The nanosilica composite is formed using a nanosilicon oxide which preferably has more than 50% free silanol groups. The nanosilicon oxide can be obtained as a well dispersed colloid (e.g., from Nissan Chemicals) is predispersed in a solvent. Typical solvents can include alcohols such as isopropyl alcohol or methanol.

In the process for forming the nanosilica composite, it can first be combined with a silicon compound having a vinyl group, said silicon compound selected from the group consisting of disilazanes or silanes, or at least one of a hydrolysis and condensation product of a silane having a vinyl group, formed by reacting the silane with a nanosilicon oxide colloid containing greater than 0% water.

A "vinyl functional group" as used herein means $CH_2{=}CH—$ with optional alkyl substitutions. The vinyl group can be present in a silicon compound such as a disilazane of the formula $(R^1{}_3Si)_2NH$, where at least one $R^1$ is a functional group represented by the vinyl group, $CH_2{=}CH—$. The remaining $R^1$ groups can be vinyl, alkyl, or aryl groups. The vinyl functional group in the silicon compounds can also be present in a silicon compound such as a silane of the formula $X—Y—SiR^1R^2R^3$. While not being bound by theory, the vinyl group may be covalently grafted to the surface of the nanoparticles using the reaction of surface hydroxyls with silanes of the type $X—Y—SiR^1R^2R^3$. X represents a vinyl $CH_2{=}CH_2—$ functional group. Y represents a divalent organic radical covalently bonded to the vinyl functional group and the silane functional group. Examples of Y radicals include substituted and unsubstituted alkylene groups having 2 to 10 carbon atoms, and substituted or unsubstituted arylene groups having 6 to 20 carbon atoms. The alkylene and arylene groups optionally additionally have ether, ester, or amide linkages therein. Substituents include halogen, mercapto, carboxyl, alkyl and aryl. $SiR^1R^2R^3$ represents an silane functional group containing three substituents ($R^{1-3}$), one or all of which are hydrolyzable; that is, they are capable of being displaced by (e.g., nucleophilic) substitution by water. For example, at least one of the $R^1$, $R^2$, and $R^3$ substituents are groups such as alkoxy, aryloxy or halogen and the substituting group comprises a group such as hydroxyl present on an silane hydrolysis or condensation product, or equivalent reactive functional group present on the substrate surface.

Examples of silanes include vinyltrimethoxysilane and vinyltriisopropoxysilane. Silazanes such as divinyltetramethyldisilazane ($H_2C{=}CH—Si(CH_3)_2NHSi(CH3)2CH{=}CH2$) can also be used. In some case, for example when silazanes are reacted in media containing alcohols, they can be transformed to the corresponding alkoxysilanes.

As a first step to forming the nanosilicon composite, a nanosilicon oxide colloid can be contacted with a least one of a hydrolysis and condensation product of the silane containing the vinyl group. The hydrolysis and condensation product can be formed by reacting the silane containing the vinyl group with a nanosilicon oxide containing greater than 0% water.

By silane hydrolysis product is meant a silane in which at least one of the $R^{1-3}$ substituents has been replaced by hydroxyl. For example, $X—Y—SiR_2OH$, $X—Y—Si(OH)_2$, and $X—Y—Si(OH)_3$. By silane condensation product is meant a product formed by condensation reaction of one or more silane and/or silane hydrolysis products. For example, condensation products include: $X—Y—Si(R^1)(R^2)OSi(R^1)(OH)—Y—X$; $X—Y—Si(R^1)(OH)OSi(R^1)(OH)—Y—X$; $X—Y—Si(OH)_2OSi(R^1)(OH)—Y—X$; $X—Y—Si(R^1)(OH)OSi(R^1)(OSi(R^1)(OH)—Y—X)—Y—X$; and $X—Y—Si(R^1)(R^2)OSi(R^1)(OSi(R^1)(OH)—Y—X)—Y—X$.

In another embodiment, the hydrolysis and/or condensation product of the silane containing the vinyl group can be formed by contacting the silane with from about 1 to about 15, preferably about 3 to about 9, moles of water per mole of hydrolyzable functional group bonded to the silicon of the silane. In a preferred embodiment, silane hydrosylate and/or condensate is formed by contacting the silane with from about 1 to about 15, preferably about 3 to about 9, moles of water per mole of hydrolyzable functional group bonded to the silicon of the silane. In a more preferred embodiment, silane hydrosylate and/or condensate is formed by contacting the silane with from about 5 to about 7 moles of water per mole of hydrolyzable functional group bonded to the silicon of the silane.

The silane hydrosylate and/or condensate is formed by contacting the silane with water in the presence of a lower alkyl alcohol solvent. Representative lower alkyl alcohol solvents include aliphatic and alicyclic $C_1$-$C_5$ alcohols such as methanol, ethanol, n-propanol, iso-propanol and cyclopentanol. Preferred of the lower alkyl alcohol solvents is ethanol.

The contacting is also performed in the presence of an acid catalyst that catalyzes hydrolysis of one, two or three of the silane substituents $R^{1-3}$, and further may catalyze condensation of the resultant silane hydrosylates. The acid catalyzes hydrolysis of silane substituents such as alkoxy and aryloxy, and result in the formation of hydroxyl (silanol) groups in their place. Preferred acids are organic acids. Organic acids comprise the elements carbon, oxygen and hydrogen, optionally nitrogen and sulfur, and contain at least one labile (acidic) proton. Examples of suitable organic acids include carboxylic acids such as acetic acid, maleic acid, oxalic acid, and formic acid, as well as sulfonic acids such as methanesulfonic acid and toluene sulfonic acid. In one embodiment, the organic acids have a pKa of at least about 4.7. A preferred organic acid is acetic acid.

In one embodiment, a concentration of from about 0.1 weight % to about 1 weight % acid in lower alkyl alcohol solvent is of utility for forming the silane hydrosylate and/or condensate from the silane. In one embodiment, a concentration of about 0.4 weight % acid in lower alkyl alcohol solvent is of utility for forming the silane hydrosylate and/or condensate from the silane.

In one embodiment, the nanosilicon oxide colloid is dispersed in alcohol. The colloid is combined with the silicon compound containing vinyl groups and is heated at elevated temperatures for a period of 1 to 24 hours under a blanket of a nitrogen or argon.

Following the procedure, the alcohol can be exchanged with a non-protic solvent such as methyl ethyl ketone (MEK), methyl isobutyl ketone (MIBK), or acetate solvents such as propyl and butyl acetates. This solvent exchange can be accomplished by any known method in the art. One procedure is to add a replacement solvent with a higher boiling point than the original solvent. An example of this is to add MIBK to an alcohol colloid mixture. The alcohol can be distilled or removed under vacuum with mild heating, so that the resultant colloid mixture contains less than 10% of the original alcohol content.

This reaction product can then be combined with a silane, having one functional group consisting of acryloylxoy and methacryloyloxy, hydrosylate and/or condensate to form a nanosilica composite precursor. The nanosilica composite precursor is allowed to age at room or elevated temperature. Nanosilica sol is combined with the silane, having one functional group consisting of acryloylxoy and methacryloyloxy, hydrosylate and/or condensate to form a nanosilica composite precursor which is allowed to age at about 25° C. for at least about 1 hour. In one embodiment, a nanosilica sol can be combined with a silane, having one functional group consisting of acryloylxoy and methacryloyloxy, hydrosylate and/or condensate to form a nanosilica composite precursor which is allowed to age at about 25° C. from about 20 hours to about 7 days (168 hours) to form the nanosilica composite. In one embodiment the nanosilica composite precursor is aged at an elevated temperature, such as but not limited to a temperature of up to about 50° C. In this embodiment, the ageing period can be shorter than the aforementioned, for example from about 1 to 24 hours.

The acryloyloxy and methacryloyloxy groups contain the functional group $CH_2$═$CH_2$—C(O)O— with optional alkyl substitutions, such as methacrylic functionalities. Specifically, the functional group can be represented by the formula X—Y—Si—. While not being bound by theory, the fragment may be covalently grafted to the surface of the nanoparticles using the reaction of surface hydroxyls with silanes of the type X—Y—$SiR^1R^2R^3$. X represents an acryloyloxy ($CH_2$═CHC(═O)O—) or methacryloyloxy ($CH_2$═C($CH_3$)C(═O)O—) functional group. Y represents a divalent organic radical covalently bonded to the acryloyloxy or methacryloyloxy functional group and the silane functional group. Examples of Y radicals include substituted and unsubstituted alkylene groups having 2 to 10 carbon atoms, and substituted or unsubstituted arylene groups having 6 to 20 carbon atoms. The alkylene and arylene groups optionally additionally have ether, ester, or amide linkages therein. Substituents include halogen, mercapto, carboxyl, alkyl and aryl. $SiR^1R^2R^3$ represents a silane functional group containing three substituents ($R^{1-3}$), one or all of which are capable of being displaced by (e.g., nucleophilic) substitution. For example, at least one of the $R^1$,$R^2$, and $R^3$ substituents are groups such as alkoxy, aryloxy or halogen and the substituting group comprises a group such as hydroxyl present on an silane hydrolysis or condensation product, or equivalent reactive functional group present on the substrate film surface. Representative $SiR^1R^2R^3$silane substitution includes where $R^1$ is $C_1$-$C_{20}$ alkoxy, $C_6$-$C_{20}$ aryloxy, or halogen, and $R^2$ and $R^3$ are independently selected from $C_1$-$C_{20}$ alkoxy, $C_6$-$C_{20}$ aryloxy, $C_1$-$C_{20}$ alkyl, $C_6$-$C_{20}$ aryl, $C_7$-$C_{30}$ aralkyl, $C_7$-$C_{30}$ alkaryl, halogen, and hydrogen. $R^1$ is preferably $C_1$-$C_4$ alkoxy, $C_6$-$C_{10}$ aryloxy or halogen. Example silanes include: acryloxypropyltrimethoxysilane (APTMS, $H_2C$═$CHCO_2(CH_2)_3Si(OCH_3)_3$), acryloxypropyltriethoxysilane, acryloxypropylmethyldimethoxysilane, methacryloxypropyltrimethoxysilane, methacryloxypropyltriethoxysilane, and methacryloxypropylmethyldimethoxysilane.

The silane, having one functional group consisting of acryloylxoy and methacryloyloxy, hydrosylate and/or condensate is formed by contacting the silane with from about 1 to about 15, preferably about 3 to about 9 moles of water per mole of hydrolyzable functional group bonded to the silicon of the silane. In a preferred embodiment, silane hydrosylate and/or condensate is formed by contacting the silane with from about 4 to about 9 moles of water per mole of hydrolyzable functional group bonded to the silicon of the silane. In a more preferred embodiment, silane hydrosylate and/or condensate is formed by contacting the silane with from about 5 to about 7 moles of water per mole of hydrolyzable functional group bonded to the silicon of the silane.

The silane hydrolysate and/or condensate, having one functional group consisting of acryloylxoy and methacryloyloxy, is formed by contacting the silane with water in the presence of a lower alkyl alcohol solvent. Representative lower alkyl alcohol solvents include aliphatic and alicyclic $C_1$-$C_5$ alcohols such as methanol, ethanol, n-propanol, iso-propanol and cyclopentanol. Preferred of the lower alkyl alcohol solvents is ethanol.

The contacting is also performed in the presence of an acid catalyst that catalyzes hydrolysis of one, two or three of the silane substituents $R^{1-3}$, and further may catalyze condensation of the resultant silane hydrosylates. The acid catalyzes hydrolysis of silane substituents such as alkoxy and aryloxy, and result in the formation of hydroxyl(silanol) groups in their place. Preferred acids are organic acids. Organic acids comprise the elements carbon, oxygen and hydrogen, optionally nitrogen and sulfur, and contain at least one labile (acidic) proton. Examples of suitable organic acids include carboxylic acids such as acetic acid, maleic acid, oxalic acid, and formic acid, as well as sulfonic acids such as methanesulfonic acid and toluene sulfonic acid. In one embodiment, the organic acids have a pKa of at least about 4.7. A preferred organic acid is acetic acid.

In one embodiment, a concentration of from about 0.1 weight % to about 1 weight % acid in lower alkyl alcohol solvent is of utility for forming the silane hydrosylate and/or condensate from the silane. In one embodiment, a concentration of about 0.4 weight % acid in lower alkyl alcohol solvent is of utility for forming the silane hydrosylate and/or condensate from the silane.

The conditions taught herein for the reaction of silane and water in the presence of acid and lower alkyl alcohol result in less than about 1 mol % of unhydrolyzed silane (X—Y—$SiR^1R^2R^3$) remaining in the formed silane hydrosylate and/or condensate.

In another embodiment, the compositions described above are used to form a coating. The coating can be prepared by a process that includes coating the liquid mixture on a substrate in a single coating step to form a liquid mixture coating on the substrate. Coating techniques useful for applying the uncured composition onto the substrate in a single coating step are those capable of forming a thin, uniform layer of liquid on a substrate, such as microgravure coating as described in US patent publication no. 2005/18733. Solvents of utility include polar aprotic organic solvents, and representative examples include aliphatic and alicyclic: ketones such as methyl ethyl ketone and methyl isobutyl ketone; esters such as propyl acetate; and combinations thereof. Preferred solvents include propyl acetate and methyl isobutyl ketone. Lower alkyl hydrocarbyl alcohols (e.g., methanol, ethanol, isopropanol, etc.) can be present in the solvent, but should comprise about 15% or less by weight of the solvent. The coating process includes a step of removing the solvent from the liquid mixture coating on the substrate to form an uncured coating on the substrate. The solvent can be removed by known methods, for example, heat, vacuum and/or a flow of inert gas in proximity to the coated liquid dispersion on the substrate.

Coating techniques useful for applying the uncured composition onto the substrate in a single coating step are those capable of forming a thin, uniform layer of liquid on a substrate, such as microgravure coating, for example, as described in US patent publication no. 2005/18733.

The process includes a step of curing the uncured coating. As discussed previously herein, the uncured coating is preferably cured by a free radical mechanism. Free radicals may be generated by known methods such as by the thermal decomposition of an organic peroxide, optionally included in the uncured composition, or by radiation such as ultraviolet (UV) radiation, gamma radiation, or electron beam radiation. The uncured compositions are preferably UV cured due to the relative low cost and speed of this curing technique when applied on industrial scale.

Acrylic or methacrylic-group containing functional groups on silane hydrosylates and/or condensates do not react with other components of the uncured composition under ambient conditions. However, when the uncured composition is exposed to energy (e.g., heat, light) or chemical treatment (e.g., peroxide free radical polymerization initiators), the carbon-carbon double bonds can react with other components of the uncured composition, for example, the fluoroelastomer cure site, the multiolefinic crosslinker, the photoinitiator, as well as functionality present on the surface of a substrate film on which the uncured composition is coated. The present nanosilica composite can be combined with other uncured composition reactive components without undesirably causing the uncured composition reactive components to react (crosslink) prior to curing. The uncured compositions optionally contain unreactive components such as solvent that facilitates coating as well as handling and transfer.

Thus, the present invention provides, in some embodiments, a liquid mixture for forming a low refractive index composition for use in forming an anti-reflection coating, the liquid mixture comprising:

(i) a fluoroelastomer having at least one cure site;

(ii) a multiolefinic crosslinker;

(iii) a free radical polymerization initiator; and (iv) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, said hydrolysis product or hydrolysis and condensation product formed by reacting the first silane with a nanosilicon oxide colloid containing greater than 0% water; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15, preferably about 3 to about 9, moles of water per mole of hydrolyzable functional group bonded to the silicon of the second silane.

In other embodiments, the present invention provides a liquid mixture comprising:

(i) a fluoroelastomer having at least one cure site;

(ii) a multiolefinic crosslinker;

(iii) a free radical polymerization initiator; and (iv) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, wherein the hydrolysis product or hydrolysis and condensation product is formed by contacting the first silane, in the presence of a catalyst, with from about 1 to about 15, preferably about 3 to about 9, moles of water per mole of hydrolyzable functional group bonded to the silicon of the first silane; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15, preferably about 3 to about 9 moles of water per mole of hydrolyzable functional group bonded to the silicon of the second silane.

Solvent is preferably included in the uncured composition to reduce the viscosity of the uncured composition in order to facilitate coating. The appropriate viscosity level of uncured composition containing solvent depends upon various factors such as the desired thickness of the anti-reflective coating, technique of application of the uncured composition to the substrate, and the substrate onto which the uncured composition is to be applied, and can be determined by one of ordinary skill in this field without undue experimentation. Generally, the amount of solvent in the uncured composition is about 85 weight % to about 97 weight %.

Solvent is selected such that it does not adversely affect the curing properties of the uncured composition or attack the optical display substrate. Additionally, solvent is chosen such that the addition of the solvent to the uncured composition does not result in, for example, flocculation of the nanosilica or precipitation of the fluoroelastomer. Furthermore, the solvent should be selected such that it has an appropriate drying rate. That is, the solvent should not dry too slowly, which can undesirably delay the process of making an anti-reflective coating from the uncured composition. It should also not dry too quickly, which can cause defects such as pinholes or craters in the resultant anti-reflective coating. Solvents of utility include polar aprotic organic solvents, and representative examples include aliphatic and alicyclic: ketones such as methyl ethyl ketone and methyl isobutyl ketone; esters such as propyl acetate; and combinations thereof. Preferred solvents include propyl acetate and methyl isobutyl ketone. Lower alkyl hydrocarbyl alcohols (e.g., methanol, ethanol, isopropanol, etc.) can be present in the solvent, but should comprise about 15% or less by weight of the solvent.

The present invention further includes a method for forming an coating on a substrate, said having a scratched percent of about 8 or less as determined by Method 4 (as taught herein).

The present method for forming the anti-reflective coating results in the plurality of solid nanosilica particles being located within the anti-reflective coating substantially adjacent to the substrate.

The present method includes an optional step of reducing the amount of solvent in the uncured composition coating to form a (reduced-solvent) uncured composition coating on the substrate. The amount of solvent in the uncured composition coating can be reduced by known methods, for example, heat, vacuum and a flow of inert gas in proximity to the coated liquid mixture. In this embodiment, at least about 95 weight % of the solvent is removed from the uncured composition coating before curing.

The cured anti-reflective coating has a thickness less than about 120 nm and greater than about 80 nm, and preferably less than about 110 nm and greater than about 90 nm, most preferably about 100 nm.

Further provided according to the invention is an article comprising a transparent substrate having a coating, wherein the coating comprises a composition comprising:

(i) a fluoroelastomer having at least one cure site;

(ii) a multiolefinic crosslinker;

(iii) a free radical polymerization initiator; and (iv) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, said hydrolysis product or hydrolysis and condensation product formed by reacting the first silane with a nanosilicon oxide colloid containing greater than 0% water; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15 moles of water per mole of hydrolyzable functional group bonded to the silicon of the second silane.

In another embodiment there is provided an article comprising a transparent substrate having a coating, wherein the coating comprises a composition comprising:

(i) a fluoroelastomer having at least one cure site;

(ii) a multiolefinic crosslinker;

(iii) a free radical polymerization initiator; and (iv) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, wherein the hydrolysis product or hydrolysis and condensation product is formed by contacting the first silane, in the presence of a catalyst, with from about 3 to about 9 moles of water per mole of hydrolyzable functional group bonded to the silicon of the first silane; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15 moles of water per mole of hydrolyzable functional group bonded to the silicon of the second silane.

Substrates having an anti-reflective coating of the present low refractive index composition find use as display surfaces, optical lenses, windows, optical polarizers, optical filters, glossy prints and photographs, clear polymer films, and the like. Substrates may be either transparent or anti-glare and include acetylated cellulose (e.g., triacetyl cellulose (TAC)), polyester (e.g., polyethylene terephthalate (PET)), polycarbonate, polymethylmethacrylate (PMMA), polyacrylate, polyvinyl alcohol, polystyrene, glass, vinyl, nylon, and the like. Preferred substrates are TAC, PET and PMMA. The substrates optionally have a hardcoat applied between the substrate and the anti-reflective coating, such as but not limited to an acrylate hardcoat.

As used herein, the terms “specular reflection” and “specular reflectance” refer to the reflectance of light rays into an emergent cone with a vertex angle of about 2 degrees centered around the specular angle. The terms “diffuse reflection” or “diffuse reflectance” refer to the reflection of rays that are outside the specular cone defined above. The specular reflectance for the anti-reflective coatings formed from the present low refractive index compositions on transparent substrates is about 2.2% or less, preferably about 1.7% or less.

The low refractive index compositions of the present invention have exceptional resistance to abrasion and low $R_{VIS}$ when used as anti-reflection coatings on display substrates. The present invention includes an anti-reflective coating having Rvis less than about 1.3% and a scratched percent less than or equal to 10, preferably less than or equal to 7, as determined by Method 4 (as taught herein) after abrasion by Method 1 (as taught herein).

ABREVIATIONS AND METHODS

APTMS: acryloxypropyltrimethsilane, available from Aldrich Chemicals, St. Louis, Mo.

Irgacure® 907: photoinitiator available from Ciba Specialty Chemicals, Tarrytown, N.Y., USA MIBK: methylisobutylketone Nissan MEK-ST: silica colloid in methyl ethyl ketone containing about 0.5 weight percent water, median particle diameter $d_{50}$ of about 10-16 nm, 30-31 wt % silica, available from Nissan Chemical America Co., Houston, Tex., USA. Examination of Nissan MEK-ST by solid state $^{29}$Si and $^{13}$C NMR (nuclear magnetic resonance) spectroscopy reveals that the surface (reactive silanols) of the MEK-ST nanosilica particles is functionalized with trimethylsilyl substituents.

Sartomer SR533: triallyl isocyanurate crosslinker, Sartomer Company, Inc., Exton, Pa. (Triallyl-1,3,5-triazine-2,4,6 (1H,3H,5H)-trione)

Viton® GF200S: copolymer of vinylidene fluoride, tetrafluoroethylene, hexafluoropropylene and a cure site monomer, a fluoroelastomer available from DuPont Performance Elastomers, Del., USA.

Coating Method

A substrate film is coated with an uncured composition using a Yasui-Seiki Co. Ltd., Tokyo, Japan, microgravure coating apparatus as described in U.S. Pat. No. 4,791,881. The apparatus includes a doctor blade and a Yasui-Seiki Co. gravure roll ) having a roll diameter of 20 mm.

The coated conditions were adjusted to yield a material with a final coated thickness (dry film ) displaying the lowest reflectance at 550 nm.

The coated substrate is cured using a UV exposure unit supplied by Fusion UV Systems/Gaithersburg Md. consisting of a LH-16P1 UV source (200w/cm) coupled to a DRS Conveyer/UV Processor (15 cm wide) with controlled nitrogen inerting capability over a measured range of 10 to 1,000 ppm oxygen.

Lamp power and conveyor speed are set to give a film cure using a measured energy density of 500-600 millijoules/cm$^2$ (UV-A irradiation) at about 0.7 to 1.0 m/min transport rate. An EIT UV Power Puck® radiometer is used to measure the UV total energy in the UV-A band width.

The "H" bulb used in the LH-16P1 has the following typical spectral output in the UV-B, UV-C and UV-V bands in addition to the UV-A mentioned above as shown in the table below.

"H" Bulb Spectral Performance at 2.5 m/min, 50% Power

| Band | Range (nm) | Power (w/cm$^2$) | Energy (J/cm$^2$) | time (sec) | line speed (m/min) | Exp Zone (cm) |
|---|---|---|---|---|---|---|
| UV-C | 250-260 | 0.107 | 0.079 | 0.7 | 2.5 | 3.1 |
| UV-B | 280-320 | 0.866 | 0.648 | 0.7 | 2.5 | 3.1 |
| UV-A | 320-390 | 0.891 | 0.667 | 0.7 | 2.5 | 3.1 |
| UV-V | 395-445 | 0.603 | 0.459 | 0.8 | 2.5 | 3.2 |

The oxygen level in the unit is controlled using a nitrogen purge to be at 350 ppm or less. The cured film is placed on a metal substrate preheated to 70° C. before placing it on the cure conveyer belt.

Measurement of Specular Reflectance (Rvis)

A 3.7 cm×7.5 cm piece of substrate film coated with an anti-reflective coating is prepared for measurement by adhering a strip of black PVC electrical tape (Nitto Denko, PVC Plastic tape #21) to the uncoated side of the film, in a manner that excludes trapped air bubbles, to frustrate the back surface reflections. The film is then held fixed and flat at normal to the spectrometer's optical path, with the coated surface facing up. The reflected light that is within about 2 degrees of normal incidence is captured and directed to on the stage of an infrared extended range spectrometer (Filmetrics, model F50) using adhesive tape or a flat weight. The infra-red spectrometer is calibrated between 400 nm and 1700 nm with a low reflectance standard of BK7 glass with its back surface roughened and blackened. The specular reflection is measured at normal incidence with an acceptance angle of about 2 degrees. The reflection spectrum is recorded in the range from 400 nm to 1700 nm with an interval of about 1 nm. A low noise spectrum is obtained by using a long detector integration time so that the instrument is at full range or saturated with about a 6% reflection. A further noise reduction is achieved by averaging 3 or more separate measurements of the spectrum. The reflectance reported from the recorded spectrum is the result of a color calculation of x, y, and Y where Y is reported as the specular reflectance (Rvis). The color coordinate calculation is performed for a 10 degree standard observer with a type C light source.

Quantifying Surface Abrasion—Method 1

A 3.7 cm by 7.5 cm piece of substrate film coated with an anti-reflective coating of the present invention is mounted, with the coated surface up, onto the surface of a flat glass plate by fastening the edges of the film to the plate with adhesive tape. Liberon grade #0000 steel wool is cut into patches slightly larger than 1 by 1 cm. A soft (compliant) foam pad cut to 1 by 1 cm is placed over the steel wool pad and a 1 000-gram brass weight held in a slip fit Delrin® sleeve is placed on top of the foam pad. The sleeve is moved by a stepping motor driven translation stage model MB2509P5J-S3 CO18762. A VELMEX VXM stepping motor controller drives the stepping motor. The steel wool and weight assembly are placed on the film surface and rubbed back and forth over the film surface, for 10 cycles (20 passes) over a distance of 3 cm at a velocity of 5 cm/sec.

The present method involves imaging a film abraded by the above method and quantifying the scratched percent area on the abraded film by software manipulation of the image.

No single image analysis procedure covering all possibilities exists. One of ordinary skill in the art will understand that the image analysis performed is very specific. General guidance is given here with the understanding that unspecified parameters are within the ability of the practitioner of ordinary skill to discern without undue experimentation.

This analysis assumes there are both "on axis" and "off axis" illumination of the sample and the image is taken in reflected light at about 7 degrees from normal incidence. It is also assumed that the scratches are in a vertical orientation in the image. Appropriate image contrast can be established without undue experimentation by the practitioner or ordinary skill. Image contrast is controlled by the lighting intensity, the camera white and dark reference settings, the index of refraction of the substrate, the index of refraction and the thickness of the low refractive index composition. Also to increase the contrast of the image a piece of black electrical tape is adhered to the back of the substrate. This has the effect of frustrating the back surface reflection.

The image used for analyzing the scratched area on the film generated by the above method is obtained from a video camera connected to a frame grabber card in a computer. The image is a grey scale 640 by 480 pixel image. The optics on the camera magnifies the abraded area so that the width of the imaged region is 7.3 mm (which is most of the 1 cm wide region that is abraded.)

The Adobe PhotoShop V7 with Reindeer Graphic's Image Processing Toolkit plug-ins for PhotoShop is used to process the image as described below.

First the image is converted to a grey scale image (if it is not already). A motion blur of 25 pixels in the direction of the scratches is performed to emphasize the scratches and de-emphasize noise and extraneous damage to the film. This blur does three things to clean up the image. First, damage to the film in other directions than the abrasion direction is washed out by averaging with the background. Second, individual white dots are removed by averaging with the background. Third, any small gaps in the scratches are filled in by averaging between the in line scratches.

In preparation for an automatic contrast adjustment of the pixel intensities in the image, four pixels near the upper left corner are selected. These pixels are filled in at an intensity of 200 (out of 255). This step assures that there is some mark in the image that is other than the dark background of the unabraded material, in the event that there are no bright scratches in the image. This has the effect of limiting the automatic contrast adjustment. The automatic contrast adjustment used is called "histogram limits: max-min" which alters the contrast of the image so that the histogram fills the 0 to 255 levels available in an 8-bit grey scale image.

A custom filter is then applied to the image that takes a derivative in the horizontal direction and then adds back the original image to the derivative image. This has the effect of emphasizing the edges of vertical scratches.

A bi-level threshold is applied at the 128 grey level. Pixels at a level of 128 or higher are set to white (255) and pixels below a brightness of 128 are set to black (0). The image is then inverted making the black pixels white and the white pixels black. This is to accommodate the global measurement feature used in the final step, which is the application of the global measurement of the black area. The result is given in terms of the percent of black pixels in the image. This is the percent of the total area that is scratched by the above method (i.e., scratch area %). In this invention and in the following examples, 1000 g/cm$^2$ applied pressure was used in the abrasion test with steel wool

EXAMPLES

Example 1

Vinyl+Acrylic Functional Groups 16.2 Volume % Treated SiO2

Vinyl Group Addition

In an inert atmosphere drybox, 100 grams of solid nanosilicon oxide in isopropyl alcohol (30 wt %, IPA-ST, Nissan chemicals) was combined with 100 grams of isopropyl alcohol. To this mixture was added 6.37 g of 1,3 divinyltetramethyldisilazane (Gelest Company, Morrisville, Pa., Part Number SID 4612.0). The material was transferred to a round-bottom flask and the liquid mixture was heated to 60° C. After refluxing for approximately 4 hours, the material was allowed to cool. Approximately 80-90 g of MIBK was then added to reaction mixture.

The remaining alcohols in the reaction mixture, containing MIBK, were distilled under vacuum to produce a colloid (termed Colloid 1) which contains predominantly MIBK (<10% alcohols) with the nanosilicon oxide. The colloid was filtered through 0.45 micron Telfon® filters prior to use. The material was tested by gravimetry to contain 30 wt % solids. Based on the stoichiometry of the reaction, each particle would contain 2 micromoles/m$^2$ vinyl silane on the surface (micromoles of vinyl silane on average per square meter of nanosilica particle surface area used to form the composite).

Acrylic Group Addition

APTMS was prehydrolyzed by combining 0.811 g of APTMS (Aldrich) with 13.17 g of ethanol (derived from combining 100 g of 95 volume % ethanol with 0.4 grams of glacial acetic acid). The mixture was allowed to stand for 24 hours at room temperature.

5.99 g of the prehydrolyzed APTMS was combined with 4.376 g of the nanoparticle colloid treated with divinyltetramethylsilazane (Colloid 1). This mixture was allowed to age for 24 hours, at 50° C., prior to further use, and termed Colloid 2.

Coating Formulation

A third mixture comprising fluoroelastomer was formed by combining 70.0 g of a 10 wt % solution of Viton® GF200S in MIBK, 0.70 g Sartomer SR533, 0.42 g Irgacure® 907.

To 35.56 g of this third mixture containing the Viton® and curatives was added 32.87 g of propyl acetate solvent and 8.64 grams of the acrylic and vinyl silane treated nanoparticles (Colloid 2).

The resultant uncured composition was then filtered through a 0.47μ Teflon® PTFE membrane filter and was used for coating experiments.

Antireflective Coating

A 40.6 cm by 10.2 cm strip of acrylate hard-coated triacetyl cellulose film was coated with the uncured coating solution using the coating procedures previously described.

Eight measurements were made. An average Rvis value of 1.1% was obtained with a ±0.02% 95% confidence interval. An average scratch resistance value (scratch area %) of 2.2% was obtained with a ±1% (95% confidence interval) using 1000 g/cm$^2$ applied pressure in the abrasion test with steel wool.

Comparative Example A

The same procedure as described in Example 1 was used, except that commercially available silicon oxide nanoparticles with ~95% of reactive silanols capped with trimethylsilyl groups (Nissan MEK-ST). No divinyltetramethyldisilazane was used in this preparation. APTMS was added as described in Example 1.

Sixteen measurements were made on the resulting coating. An average Rvis value of about 1.17% was obtained with a ±0.2% 95% confidence interval. An average scratch resistance value (scratch area %) of 11.4% was obtained with a ±4% (95% confidence interval) using 1000 g/cm$^2$ applied pressure in the abrasion test with steel wool. The material was determined to contain less than 5% APTMS on the surface of the nanoparticle, the remainder being the trimethylsilyl groups, as described below.

Characterization of the extent to which solid nanosilica reactive silanols are substituted with unreactive substituents can be performed by DRIFTS (diffuse reflectance infrared Fourier transform spectroscopy). Characterization of the extent to which Nissan MEK-ST solid nanosilica reactive silanols are substituted with unreactive trimethylsilyl substituents is performed by DRIFTS as follows.

The solvent in the nanosilica colloid is removed by evaporation at room temperature to produce the silicon oxide nanocolloid powder. DRIFTS measurements are made with the use of a Harrick 'Praying Mantis' DRIFTS accessory in a Biorad FTS 6000 FTIR Spectrometer. Samples are diluted to a concentration of 10% in KCl for DRIFTS analysis. Grinding is avoided in preparing the dilutions to avoid changing the nature of the surface of the nanosilica. Data processing is performed using the GRAMS/32 spectroscopy software suite by Thermo Scientific. After baseline offset correction, the data is transformed using the Kubelka-Munk transform to linearize the response to sample concentration. Spectra are normalized to the height of the silica overtone band near 1874 $cm^{-1}$ in all comparisons to correct for slight differences in sample concentration. A sample of Nissan MEK-ST was compared with a sample of Nissan IPA-ST (Nissan IPA-ST is unfunctionalized Nissan MEK-ST in isopropyl alcohol). A DRIFTS spectrum was obtained on a sample. The sample was then introduced into a closed vessel containing an open container of APTMS and maintained in the vessel for 1 hour under standard conditions. Without disrupting the sample, a DRIFTS spectrum of the sample was then obtained. The band observed at about 3737 $cm^{-1}$ corresponds to reactive silanol groups. For Nissan IPA-ST, the intensity of this band was significantly reduced as a result of exposure of the sample to APTMS. Without wishing to be bound by theory, the present inventors believe that this is due to the unfunctionalized reactive silanols interacting with the APTMS. For Nissan MEK-ST, there is substantially no change in the intensity of this band as a result of exposure of the sample to APTMS. Without wishing to be bound by theory, the present inventors believe that this is due to the relative absence of reactive silanols on the surface of Nissan MEK-ST for the APTMS to interact with. Based on the integrated intensity of the reactive silanol band at 3737 $cm^{-1}$, which is derived on the Nissan IPA-ST sample, it is estimated that the reactive silanol coverage on the Nissan MEK-ST sample is less than 5% of the coverage that is observed on the Nissan IPA-ST sample. Therefore, approximately 95% or more of the reactive silanols on the surface of Nissan MEK-ST are substituted with an unreactive substituent (trimethylsilyl).

Comparative Example B

Higher Vinyl Content

The same procedure as described in Example 1 was followed except for the following differences. 20 g of $SiO_2$ nanocolloid was treated with 5.093 g of divinyltetramethyldisilazane. Based on the stoichiometry of the reaction, each particle would contain about 8 micromoles/$m^2$ vinyl silane on the surface.

Four measurements were performed on the resulting coating. A scratch area % of about 24% was obtained at 1000 g/$cm^2$ applied weight.

Example 2

Vinyl+Acrylic Groups 16.2 Volume % Treated $SiO_2$

Vinyl Group Addition

The same procedure as described in Example 1 was followed, for the following differences. In an inert atmosphere drybox, 50 grams of solid nanosilicon oxide in isopropyl alcohol (30 wt %, IPA-ST, Nissan chemicals) was combined with 50 grams of isopropyl alcohol. To this mixture was added 6.37 g of 1,3 divinyltetramethyldisilazane (Gelest Company, Morrisville, Pa., Part Number SID 4612.0). The material was transferred to a round-bottom flask and the liquid mixture was heated to 60° C. After refluxing for approximately 4 hours, the material was allowed to cool. Approximately 80-90 g of MIBK is then added to reaction mixture. The final colloid was measured, by gravimetry, to contain 30.28 wt % solids. Based on the stoichiometry of the reaction, each particle would contain 4 micromoles/$m^2$ APTMS (acrylic silane) on the surface.

The remaining alcohols in the reaction mixture, containing MIBK, were distilled under vacuum to produce a colloid (termed Colloid 1) which contains predominantly MIBK (<10% alcohols) with the nanosilicon oxide. The colloid was filtered through 0.45 micron Telfon® filters prior to use. The material was tested by gravimetry to contain 30.28 wt % solids. Based on the stoichiometry of the reaction, each particle would contain 4 micromoles/$m^2$ vinyl silane on the surface.

Acrylic Group Addition

APTMS was prehydrolyzed by combining 0.811 g of APTMS (Aldrich) with 13.17 g of ethanol (derived from combining 100 g of 95 volume % ethanol with 0.4 grams of glacial acetic acid). The mixture was allowed to stand for 24 hours at room temperature.

5.99 g of the prehydrolyzed APTMS was combined with 4.335 g of the nanoparticle colloid treated with divinyltetramethylsilazane (Colloid 1). This mixture was allowed to age for 24 hours, at 50° C., prior to further use, and termed Colloid 2.

Coating Formulation:

A third mixture comprising fluoroelastomer was formed by combining 35 g of a 10 wt % solution of Viton® GF200S in MIBK, 0.35 Sartomer SR533, 0.21 Irgacure® 907.

To 35.56 g of this third mixture containing the Viton and curatives was added 26.34 g propyl acetate solvent and 8.60 grams of the acrylic and vinyl silane treated nanoparticles (Colloid 2).

The resultant uncured composition was then filtered through a 0.47μ Teflon® PTFE membrane filter and was used for coating experiments.

Antireflective Coating

A 40.6 cm by 10.2 cm strip of acrylate hard-coated triacetyl cellulose film was coated with the uncured coating solution as described using the coating procedures previously described.

Four measurements were made. An average Rvis value of 0.96% was obtained with a ±0.10% 95% confidence interval. An average scratch resistance value (scratch area %) of 4% was obtained with a ±9% (95% confidence interval) using 1000 g/$cm^2$ applied pressure in the abrasion test with steel wool.

Comparative Example C

Acrylic (APTMS at 4 Micromoles/m2)+Acrylic Groups (APTMSH) 16.2 Volume % Treated SiO2

Acrylic Silane Treatment

The same procedure as described in example 1 was followed, for the following differences. In an inert atmosphere drybox, 50 grams of solid nanosilicon oxide in isopropyl alcohol (30 wt %, IPA-ST, Nissan chemicals) was combined with 50 grams of isopropyl alcohol. To this mixture is added 8.046 g of APTMS (acryloxypropyltrimethsilane, available from Aldrich Chemicals, St. Louis, Mo.). The material is transferred to a round-bottom flask and the liquid mixture is heated to 60 C. After refluxing for approximately 4 hours, the material is allowed to cool. Approximately 80-90 g of MIBK was then added to reaction mixture. The final colloid was measured, by gravimetry, to contain 40.87 wt % solids. Based on the stoichiometry of the reaction, each particle would contain 4 micromoles/$m^2$ APTMS (acrylic silane) on the surface.

Acrylic Group Addition—(as APTMSH)

APTMS was prehydrolyzed by combining 0.811 g of APTMS (Aldrich) with 13.17 g of ethanol (derived from combining 100 g of 95 volume % ethanol with 0.4 grams of glacial acetic acid). The mixture was allowed to stand for 24 hours at room temperature.

5.99 g of the prehydrolyzed APTMS was combined with 3.212 g of the nanoparticle colloid treated with APTMS (colloid 1) to form Colloid 2. This mixture was allowed to age for 24 hours, at 50 C, prior to further use.

Coating Formulation

A third mixture comprising fluoroelastomer was formed by combining 35 g of a 10 wt % solution of Viton® GF200S in MIBK, 0.35 Sartomer SR533, 0.21 Irgacure® 907. To 35.56 g of this third mixture containing the Viton and curatives was added 27.27 g propyl acetate solvent and 7.67 grams of the treated nanoparticles (colloid 2). The resultant uncured composition was then filtered through a 0.47μ Teflon® PTFE membrane filter and was used for coating experiments.

Antireflective Coating

A 40.6 cm by 10.2 cm strip of acrylate hard-coated triacetyl cellulose film was coated with the uncured coating solution as described using the coating procedures previously described.

Four measurements were made. An average Rvis value of 1.06% was obtained with a ±0.13% 95% confidence interval. An average scratch resistance value (scratch area %) of 50% was obtained using 1000 g/cm$^2$ applied pressure in the abrasion test with steel wool.

Comparative Example D

Acrylic+Acrylic Functional Groups (APTMSH) 16.2 Volume % Treated $SiO_2$

Acrylic Addition

The same procedure as described in example 1 was followed, for the following differences. APTMS was prehydrolyzed by combining 0.811 g of APTMS (Aldrich) with 13.17 g of ethanol (derived from combining 100 g of 95 volume % ethanol with 0.4 grams of glacial acetic acid). The mixture was allowed to stand for 24 hours at room temperature. In an inert atmosphere drybox, 14.17 grams of solid nanosilicon oxide in isopropyl alcohol (30 wt %, IPA-ST, Nissan chemicals) was combined with 14.167 grams of isopropyl alcohol. To this mixture was added 78.61 g of the prehydrolyzed APTMS solution. The material was transferred to a round-bottom flask and the liquid mixture was heated to 60° C. After refluxing for approximately 4 hours, the material was allowed to cool. Approximately 80-90 g of MIBK was then added to reaction mixture. The final colloid was measured, by gravimetry, to contain 30.67 wt % solids. Based on the stoichiometry of the reaction, each particle would contain >8 micromoles/m$^2$ APTMS (acrylic silane) on the surface. This mixture was termed Colloid 1.

Coating Formulation

A mixture comprising fluoroelastomer was formed by combining 35 g of a 10 wt % solution of Viton® GF200S in MIBK, 0.35 Sartomer SR533, 0.21 Irgacure® 907. 35.56 g of this third mixture containing the Viton and curatives was added 27.5098 g propyl acetate solvent and 7.43 grams of Colloid 1.

The resultant uncured composition was then filtered through a 0.47μ Teflon® PTFE membrane filter and was used for coating experiments.

Antireflective Coating

A 40.6 cm by 10.2 cm strip of acrylate hard-coated triacetyl cellulose film was coated with the uncured coating solution as described using the coating procedures previously described. Four measurements were made. An average Rvis value of 1.22% was obtained with a ±0.12% 95% confidence interval. An average scratch resistance value (scratch area %) of 95% was obtained using 1000 g/cm2 applied pressure in the abrasion test with steel wool.

Comparative Example E

Allyl+Acrylic Silane Groups 16.2 Volume % Treated $SiO_2$

Allyl Addition

The same procedure as described in example 1 was followed, for the following differences. In an inert atmosphere drybox, 50 grams of solid nanosilicon oxide in isopropyl alcohol (30 wt %, IPA-ST, Nissan chemicals) was combined with 50 grams of isopropyl alcohol. To this mixture was added 2.786 g of allyltrimethoxysilane, available from Gelest, Inc., Morrisville, Pa.). The material was transferred to a round-bottom flask and the liquid mixture is heated to 60° C. After refluxing for approximately 4 hours, the material was allowed to cool. Approximately 80-90 g of MIBK was then added to reaction mixture.

The final colloid (termed Colloid 1) was measured, by gravimetry, to contain 28.42 wt % solids. Based on the stoichiometry of the reaction, each particle would contain 2 micromoles/m$^2$ allyl silane on the surface.

Acrylic Group Addition

APTMS was prehydrolyzed by combining 0.811 g of APTMS (Aldrich) with 13.17 g of ethanol (derived from combining 100 g of 95 volume % ethanol with 0.4 grams of glacial acetic acid). The mixture was allowed to stand for 24 hours at room temperature.

5.99 g of the prehydrolyzed APTMS was combined with 4.619 g of the nanoparticle colloid treated with allyltrimethoxysilane (colloid 1). This mixture was allowed to age for 24 hours, at 50° C., prior to further use, and termed Colloid 2.

Coating Formulation

A third mixture comprising fluoroelastomer was formed by combining 35 g of a 10 wt % solution of Viton® GF200S in MIBK, 0.35 Sartomer SR533, 0.21 Irgacure® 907. To 35.56 g of this third mixture containing the Viton® and curatives was added 26.10 g propyl acetate solvent and 8.84 grams of the allylic and acrylic silane treated nanoparticles (Colloid 2).

The resultant uncured composition was then filtered through a 0.47μ Teflon® PTFE membrane filter and was used for coating experiments.

Antireflective Coating

A 40.6 cm by 10.2 cm strip of acrylate hard-coated triacetyl cellulose film was coated with the uncured coating solution as described using the coating procedures previously described. Four measurements were made. An average Rvis value of 1.1% was obtained with a ±0.16% 95% confidence interval. An average scratch resistance value (scratch area %) of 56% was obtained with a ±50% (95% confidence interval) using 1000 g/cm$^2$ applied pressure in the abrasion test with steel wool.

Comparative F

Allyl+Acrylic Functional Groups 16.2 Volume % Treated $SiO_2$

The same procedure as described in example 1 was followed, for the following differences. In an inert atmosphere drybox, 50 grams of solid nanosilicon oxide in isopropyl alcohol (30 wt %, IPA-ST, Nissan chemicals) was combined with 50 grams of isopropyl alcohol. To this mixture was added 5.571 g of allyltrimethoxysilane, available from Gelest, Inc., Morrisville, Pa.). The material was transferred to a round-bottom flask and the liquid mixture is heated to 60° C. After refluxing for approximately 4 hours, the material was allowed to cool. Approximately 80-90 g of MIBK is then added to reaction mixture. The final colloid (Colloid 1) was measured, by gravimetry, to contain 37.26 wt % solids. Based on the stoichiometry of the reaction, each particle would contain 4 micromoles/$m^2$ allyl silane on the surface.

Acrylic Group Addition

APTMS was prehydrolyzed by combining 0.811 g of APTMS (Aldrich) with 13.17 g of ethanol (derived from combining 100 g of 95 volume % ethanol with 0.4 grams of glacial acetic acid). The mixture was allowed to stand for 24 hours at room temperature.

5.99 g of the prehydrolyzed APTMS was combined with 3.523 g of the nanoparticle colloid treated with allyltrimethoxysilane (Colloid 1). This mixture was allowed to age for 24 hours, at 50° C., prior to further use.

Coating Formulation

A third mixture comprising fluoroelastomer was formed by combining 35 g of a 10 wt % solution of Viton® GF200S in MIBK, 0.35 Sartomer SR533, 0.21 Irgacure® 907. To 35.56 g of this third mixture containing the Viton and curatives was added 27.013 g propyl acetate solvent and 7.93 grams of the allylic and acrylic silane treated nanoparticles (Colloid 2). The resultant uncured composition was then filtered through a 0.47μ Teflon® PTFE membrane filter and was used for coating experiments.

Antireflective Coating

A 40.6 cm by 10.2 cm strip of acrylate hard-coated triacetyl cellulose film was coated with the uncured coating solution as described using the coating procedures previously described. Four measurements were made. An average Rvis value of 1.03% was obtained with a ±0.06% 95% confidence interval. An average scratch resistance value (scratch area %) of >95% was obtained (95% confidence interval) using 1000 g/$cm^2$ applied pressure in the abrasion test with steel wool.

Comparative G

Allyl+Acrylic Functional Groups 16.2 Volume % Treated $SiO_2$

Allyl Addition

The same procedure as described in example 1 was followed, for the following differences. In an inert atmosphere drybox, 50 grams of solid nanosilicon oxide in isopropyl alcohol (30 wt %, IPA-ST, Nissan chemicals) was combined with 50 grams of isopropyl alcohol. To this mixture was added 11.142 g of allyltrimethoxysilane (available from Gelest, Inc., Morrisville, Pa.). The material was transferred to a round-bottom flask and the liquid mixture is heated to 60° C. After refluxing for approximately 4 hours, the material was allowed to cool. Approximately 80-90 g of MIBK was then added to reaction mixture. The final colloid (termed Colloid 1) was measured, by gravimetry, to contain 44.04 wt % solids. Based on the stoichiometry of the reaction, each particle would contain 8 micromoles/$m^2$ allyl silane on the surface.

Acrylic Group Addition

APTMS was prehydrolyzed by combining 0.811 g of APTMS (Aldrich) with 13.17 g of ethanol (derived from combining 100 g of 95 volume % ethanol with 0.4 grams of glacial acetic acid). The mixture was allowed to stand for 24 hours at room temperature.

5.99 g of the prehydrolyzed APTMS was combined with 2.981 g of the nanoparticle colloid treated with allyltrimethoxysilane (Colloid 1). This mixture was allowed to age for 24 hours, at 50° C., prior to further use, and termed Colloid 2.

Coating Formulation

A third mixture comprising fluoroelastomer was formed by combining 35 g of a 10 wt % solution of Viton® GF200S in MIBK, 0.35 Sartomer SR533, 0.21 Irgacure® 907. To 35.56 g of this third mixture containing the Viton® and curatives was added 27.465 g propyl acetate solvent and 7.48 grams of the acrylic and allylic silane treated nanoparticles (Colloid 2).

The resultant uncured composition was then filtered through a 0.47μ Teflon® PTFE membrane filter and was used for coating experiments.

Antireflective Coating

A 40.6 cm by 10.2 cm strip of acrylate hard-coated triacetyl cellulose film was coated with the uncured coating solution as described using the coating procedures previously described. Eight measurements were made. An average Rvis value of 1.05% was obtained with a ±0.07% 95% confidence interval. An average scratch resistance value (scratch area %) of >95% was obtained using 1000 g/$cm^2$ applied pressure in the abrasion test with steel wool.

Table 1 below summarizes the results from the Examples. The column labeled "surface" is based on the stoichiometry of the reaction and is expressed on the basis of micromoles of the first silane per meters squared of geometric area on the nanoparticles. It can be seen that Examples 1 and 2 show improvement in scratch resistance (lower scratch area %) with a low Rvis compared with other combinations.

TABLE 1

| | | Surface (First Silane) | Rvis (%) | Abrasion (Scratch Area % at 1000 g/cm2, steel wool test) |
|---|---|---|---|---|
| Ex. 1 | Vinyl + Acrylic | 2 μm/m2 vinyl | 1.1 | 2.2% |
| Comp. A | Trimethylsilyl (~95%) + acrylic | >7 μm/$m^2$ trimethylsilyl | 1.17 | 11.4% |
| Comp. B | Higher vinyl + acylic | 8 μm/$m^2$ vinyl | Not measured | 24% |
| Ex. 2 | Vinyl + Acrylic | 4 μm/$m^2$ vinyl with remainder acrylic | 0.96 | 4% |
| Comp. C | Acrylic + Acrylic from prehydrolysing APTMS | 4 μm/$m^2$ acrylic (from first acrylic silane) with remainder acrylic fro prehydrolyzed APTMS | 1.06 | 50% |
| Comp. D | Acrylic from prehydrolyzed APTMS | >8 μm/$m^2$ acrylic based on the stoichiometry of reaction | 1.22 | 95% |
| Comp. E | Allyl + Acrylic | 2 μm/$m^2$ allyl | 1.1 | 56% |
| Comp. F | Allyl + Acrylic | 4 μm/$m^2$ allyl | 1.03 | >95% |
| Comp. G | Allyl + Acrylic | 8 um/m2 allyl | 1.05 | >95 |

What is claimed is:

1. An uncured composition comprising:

(i) a fluoroelastomer having at least one cure site;

(ii) a multiolefinic crosslinker;

(iii) a free radical polymerization initiator; and (iv) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, said hydrolysis product or hydrolysis and condensation product formed by reacting the first silane with a nanosilicon oxide colloid containing greater than 0% water; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15 moles of water per mole of hydrolyzable functional group bonded to the silicon of the second silane.

2. An uncured composition comprising:

(i) a fluoroelastomer having at least one cure site;

(ii) a multiolefinic crosslinker;

(iii) a free radical polymerization initiator; and (iv) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, wherein the hydrolysis product or hydrolysis and condensation product is formed by contacting the first silane, in the presence of a catalyst, with from about 3 to about 9 moles of water per mole of hydrolyzable functional group bonded to the silicon of the first silane; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15 moles of water per mole of hydrolyzable functional group bonded to the silicon of the second silane.

3. The composition of claim 1 wherein the vinyl functional groups of the silicon compound are present at less than about 6 micromoles per $m^2$ of geometric area of the nanosilica particles.

4. The composition of claim 1, wherein said fluoroelastomer comprises copolymerized units of vinylidene fluoride, hexafluoropropylene, tetrafluoroethylene, and cure site monomer.

5. The composition of claim 1, wherein said at least one cure site is selected from the group consisting of bromine, iodine and ethenyl.

6. The composition of claim 1, wherein said at least one cure site is iodine.

7. The composition of claim 1, wherein the nanosilica particles are present in a quantity of about 10 to about 40 volume percent of the composition.

8. An optical film comprising a transparent substrate and having thereon a coating formed of the composition according to claim 1 or 2.

9. The optical film of claim 8 having a scratch area percent of 7 or less as determined by Method 1 and a Rvis of 1.1% or less.

10. An article comprising a substrate having a coating comprising the composition of claim 1.

11. An article comprising a substrate having a coating comprising the composition of claim 2.

12. The article of claim 10 wherein the vinyl functional groups are present at less than about 6 micromoles per $m^2$ of geometric area of the nanosilica particles.

13. The article of claim 10 wherein said fluoroelastomer comprises copolymerized units of vinylidene fluoride, hexafluoropropylene, tetrafluoroethylene, and cure site monomer.

14. The article of claim 10 wherein said at least one cure site is selected from the group consisting of bromine, iodine and ethenyl.

15. The article of claim 10 wherein said at least one cure site is iodine.

16. The article of claim 10 wherein the nanosilica particles are present in a quantity of about 10 to about 40 weight percent of the composition.

17. The article of claim 10 wherein said abrasion resistant anti-reflective coating has a scratch area percent less than or equal to 4 as determined by Method 1 and a Rvis less than or equal to 1.1%.

18. A method for forming a coating on a substrate, comprising:

(i) forming a liquid mixture comprising a solvent having dissolved therein;

(i-a) a fluoroelastomer having at least one cure site;

(i-b) a multiolefinic crosslinker;

(i-c) a free radical polymerization initiator; and (i-d) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, said hydrolysis product or hydrolysis and condensation product formed by reacting the first silane with a nanosilicon oxide colloid containing greater than 0% water; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15 moles of water per mole of hydrolyzable functional group bonded to the silicon of the second silane;

(ii) applying said liquid mixture onto a substrate to form a liquid mixture coating on said substrate;

(iii) removing solvent from said liquid mixture coating to form an uncured coating on said substrate; and (iv) curing said uncured coating.

19. A method for forming a coating on a substrate, comprising:

(i) forming a liquid mixture comprising a solvent having dissolved therein;

(i-a) a fluoroelastomer having at least one cure site;

(i-b) a multiolefinic crosslinker;

(i-c) a free radical polymerization initiator; and (i-d) a nanosilica composite comprising:

a plurality of nanosilica particles which have been reacted with a silicon compound having at least one vinyl group, said silicon compound selected from the group consisting of: disilazanes, a first silane having a hydrolysable functional group, and a hydrolysis product or a hydrolysis and condensation product of the first silane, wherein the hydrolysis product or hydrolysis and condensation product is formed by contacting the first silane, in the presence of a catalyst, with from about 1 to about 15 moles of water per mole of hydrolyzable functional group bonded to the silicon of the first silane; and said nanosilica particles further having been reacted with a second silane having at least one acryloyloxy or methacryloyloxy functional group and a hydrolyzable functional group bonded to the silicon of the second silane, and at least one of a hydrolysis product or hydrolysis and condensation product of the second silane; wherein the hydrolysis product or hydrolysis and condensation product is formed by contacting the second silane, in the presence of a catalyst, with from about 1 to about 15 moles of water per mole of hydrolyzable functional group bonded to the silicon of the second silane;

(ii) applying said liquid mixture onto a substrate to form a liquid mixture coating on said substrate;

(iii) removing solvent from said liquid mixture coating to form an uncured coating on said substrate; and (iv) curing said uncured coating.

20. The method of claim 18 wherein the vinyl functional groups are present at less than about 6 micromoles per $m^2$ of geometric area of the nanosilica particles.

21. The method of claim 18 wherein said fluoroelastomer comprises copolymerized units of vinylidene fluoride, hexafluoropropylene, tetrafluoroethylene, and cure site monomer.

22. The method of claim 18 wherein said at least one cure site is selected from the group consisting of bromine, iodine and ethenyl.

23. The method of claim 18 wherein said at least one cure site is iodine.

24. The method of claim 18 wherein the nanosilica particles are present in a quantity of about 10 to about 40 weight percent of the composition.

25. The method of claim 18 wherein said coating has a scratch area percent less than or equal to 4 as determined by Method 1 and a Rvis less than or equal to 1.1%.

* * * * *